United States Patent
Yanagawa et al.

(10) Patent No.: US 12,466,004 B2
(45) Date of Patent: Nov. 11, 2025

(54) METHOD OF MANUFACTURING A BRAZING SHEET

(71) Applicant: UACJ Corporation, Tokyo (JP)

(72) Inventors: Yutaka Yanagawa, Tokyo (JP); Tomoki Yamayoshi, Tokyo (JP); Tatsuya Ide, Tokyo (JP); Taichi Suzuki, Tokyo (JP)

(73) Assignee: UACJ Corporation, Tokyo (JP)

( * ) Notice: Subject to any disclaimer, the term of this patent is extended or adjusted under 35 U.S.C. 154(b) by 549 days.

(21) Appl. No.: 17/905,423

(22) PCT Filed: Mar. 22, 2021

(86) PCT No.: PCT/JP2021/011667
§ 371 (c)(1),
(2) Date: Sep. 1, 2022

(87) PCT Pub. No.: WO2021/205856
PCT Pub. Date: Oct. 14, 2021

(65) Prior Publication Data
US 2023/0158613 A1    May 25, 2023

(30) Foreign Application Priority Data
Apr. 8, 2020    (JP) .................................. 2020-069976

(51) Int. Cl.
*B23K 35/28*    (2006.01)
*B23K 35/02*    (2006.01)
(Continued)

(52) U.S. Cl.
CPC ........ *B23K 35/286* (2013.01); *B23K 35/0238* (2013.01); *B32B 15/016* (2013.01);
(Continued)

(58) Field of Classification Search
CPC .............. B23K 35/286; B23K 35/0238; B23K 2103/10; B32B 15/016; C22C 21/02; C22F 1/043; C22F 1/05; C23F 1/20
See application file for complete search history.

(56) References Cited

U.S. PATENT DOCUMENTS

| | | |
|---|---|---|
| 5,171,377 A | 12/1992 | Shimizu et al. |
| 6,113,667 A | 9/2000 | Hyogo et al. |
| | (Continued) | |

FOREIGN PATENT DOCUMENTS

| | | |
|---|---|---|
| FR | 2941241 A1 | 7/2010 |
| JP | H04100696 A | 4/1992 |
| | (Continued) | |

OTHER PUBLICATIONS

JP-2001158981-A english (Year: 2001).*

(Continued)

*Primary Examiner* — Ricardo D Morales
(74) *Attorney, Agent, or Firm* — J-TEK LAW PLLC; Jeffrey D. Tekanic; Scott T. Wakeman

(57) ABSTRACT

A brazing-sheet manufacturing method includes superposing a core-material slab on or adjacent to at least one surface of a filler-material slab to form a clad slab, the core-material slab being composed of an aluminum material and the filler-material slab being composed of an Al—Si—Mg series alloy. Then, the clad slab is hot rolled to form a clad sheet having a core material layer composed of the aluminum material of the core-material slab and a filler material layer composed of the Al—Si—Mg series alloy of the filler-material slab. Then, the clad sheet is subjected to one or more passes of cold rolling. Either between cold-rolling passes or after the completion of the cold rolling, a surface (Continued)

of the clad sheet is etched using a liquid etchant that includes one or more inorganic acids. The liquid etchant does not contain fluorine atoms.

23 Claims, 1 Drawing Sheet

(51) Int. Cl.
| | |
|---|---|
| B23K 103/10 | (2006.01) |
| B32B 15/01 | (2006.01) |
| C22C 21/02 | (2006.01) |
| C22F 1/043 | (2006.01) |
| C22F 1/05 | (2006.01) |
| C23F 1/20 | (2006.01) |

(52) U.S. Cl.
CPC .............. *C22C 21/02* (2013.01); *C22F 1/043* (2013.01); *C22F 1/05* (2013.01); *C23F 1/20* (2013.01); *B23K 2103/10* (2018.08)

(56) References Cited

U.S. PATENT DOCUMENTS

| | | | |
|---|---|---|---|
| 6,341,651 | B1 | 1/2002 | Ohta |
| 6,528,468 | B2 | 3/2003 | Matsukawa et al. |
| 6,896,977 | B2 | 5/2005 | Nishimura et al. |
| 7,018,722 | B2 | 3/2006 | Toyama et al. |
| 7,107,680 | B2 | 9/2006 | Ueda |
| 7,337,941 | B2 | 3/2008 | Kilmer et al. |
| 7,926,701 | B2 | 4/2011 | Dulac et al. |
| 8,043,711 | B2 | 10/2011 | Koshigoe et al. |
| 8,247,083 | B2 | 8/2012 | Izumi et al. |
| 8,413,876 | B2 | 4/2013 | Dulac et al. |
| 9,744,610 | B2 | 8/2017 | Terada et al. |
| 10,661,395 | B2 | 5/2020 | Ichikawa et al. |
| 10,773,325 | B2 | 9/2020 | Eckhard et al. |
| 11,225,051 | B2 | 1/2022 | Jacoby et al. |
| 11,571,769 | B2 | 2/2023 | Yanagawa et al. |
| 2001/0018965 | A1 | 9/2001 | Matsukawa et al. |
| 2001/0040180 | A1 | 11/2001 | Wittebrood et al. |
| 2002/0005230 | A1 | 1/2002 | Watsuji et al. |
| 2002/0012811 | A1 | 1/2002 | Wittebrood et al. |
| 2002/0037425 | A1 | 3/2002 | Mooij et al. |
| 2002/0086179 | A1 | 7/2002 | Wittebrood |
| 2002/0102431 | A1 | 8/2002 | Wittebrood et al. |
| 2003/0084569 | A1 | 5/2003 | Hyogo et al. |
| 2004/0009358 | A1 | 1/2004 | Scott et al. |
| 2004/0028940 | A1 | 2/2004 | Toyama et al. |
| 2004/0238605 | A1 | 12/2004 | Nishimura et al. |
| 2005/0006065 | A1 | 1/2005 | Katsumata et al. |
| 2005/0034848 | A1 | 2/2005 | Ueda |
| 2005/0189047 | A1 | 9/2005 | Hasegawa et al. |
| 2006/0000586 | A1 | 1/2006 | Katsumata et al. |
| 2006/0102691 | A1 | 5/2006 | Toyama et al. |
| 2006/0243778 | A1 | 11/2006 | Yamaguchi et al. |
| 2007/0017605 | A1 | 1/2007 | Nakamura et al. |
| 2007/0158386 | A1 | 7/2007 | Dulac et al. |
| 2008/0003451 | A1 | 1/2008 | Suzuki et al. |
| 2009/0165901 | A1 | 7/2009 | Koshigoe et al. |
| 2010/0266871 | A1 | 10/2010 | Matsuo et al. |
| 2011/0114228 | A1 | 5/2011 | Nakamura et al. |
| 2011/0198392 | A1 | 8/2011 | Wittebrood |
| 2011/0240280 | A1 | 10/2011 | Izumi et al. |
| 2011/0287276 | A1 | 11/2011 | Izumi et al. |
| 2012/0145365 | A1 | 6/2012 | Yamashita et al. |
| 2013/0118013 | A1 | 5/2013 | Yamashita et al. |
| 2014/0315042 | A1* | 10/2014 | Suzuki ............... B23K 35/0233 228/205 |
| 2014/0322558 | A1 | 10/2014 | Takeda et al. |
| 2014/0329109 | A1 | 11/2014 | Takewaka et al. |
| 2015/0000783 | A1 | 1/2015 | Terada et al. |
| 2015/0037607 | A1 | 2/2015 | Itoh et al. |
| 2015/0068713 | A1 | 3/2015 | Sucke et al. |
| 2015/0118517 | A1 | 4/2015 | Itoh et al. |
| 2015/0165564 | A1 | 6/2015 | Ahl et al. |
| 2015/0239071 | A1 | 8/2015 | Kiga |
| 2015/0321293 | A9 | 11/2015 | Itoh et al. |
| 2016/0325367 | A1 | 11/2016 | Eckhard et al. |
| 2016/0332209 | A1 | 11/2016 | Yamashita et al. |
| 2017/0151637 | A1 | 6/2017 | Ichikawa et al. |
| 2017/0151638 | A1 | 6/2017 | Itoh et al. |
| 2017/0282271 | A1 | 10/2017 | Itoh et al. |
| 2018/0133845 | A1 | 5/2018 | Itoh et al. |
| 2018/0141166 | A1 | 5/2018 | Itoh et al. |
| 2018/0169797 | A1 | 6/2018 | Izumi et al. |
| 2018/0214964 | A1 | 8/2018 | Itoh et al. |
| 2018/0282843 | A1 | 10/2018 | Hasegawa et al. |
| 2019/0077119 | A1 | 3/2019 | Jacoby et al. |
| 2019/0151973 | A1 | 5/2019 | Itoh et al. |
| 2019/0291218 | A1 | 9/2019 | Itoh et al. |
| 2019/0314916 | A1 | 10/2019 | Itoh et al. |
| 2019/0337074 | A1 | 11/2019 | Miyake |
| 2020/0061758 | A1 | 2/2020 | Itoh et al. |
| 2020/0338671 | A1 | 10/2020 | Itoh |
| 2021/0213568 | A1 | 7/2021 | Yanagawa et al. |

FOREIGN PATENT DOCUMENTS

| | | | |
|---|---|---|---|
| JP | H10180489 | A | 7/1998 |
| JP | 2000225461 | A | 8/2000 |
| JP | 2001158981 | A * | 6/2001 |
| JP | 2001158983 | | 6/2001 |
| JP | 2002332581 | A | 11/2002 |
| JP | 2014037576 | A | 2/2014 |
| JP | 2017505231 | A | 2/2017 |
| WO | 2013105637 | A1 | 7/2013 |
| WO | 2017115597 | A1 | 7/2017 |
| WO | 2017137236 | A1 | 8/2017 |
| WO | 2018100793 | A1 | 6/2018 |
| WO | 2020054564 | A1 | 3/2020 |

OTHER PUBLICATIONS

Office Action from the Chinese Patent Office dispatched Jun. 4, 2024, in related CN application No. 202180013843.3, and translation thereof.
Office Action from the Japanese Patent Office dispatched May 28, 2024, in related JP application No. 2020-069976, and translation thereof.
Second Office Action from the Chinese Patent Office dispatched Sep. 26, 2024, in related CN application No. 202180013843.3, and translation thereof.
Office Action from the Chinese Patent Office dispatched Nov. 27, 2024 in related CN application No. 202180013843.3, and translation thereof.
English translation of the International Search Report dated Oct. 14, 2021 in parent application No. PCT/JP2021/011667.
English translation of the Written Opinion of the International Searching Authority in parent application No. PCT/JP2021/011667.
Amendment and Response to Office Action mailed May 16, 2025, filed on Aug. 11, 2025, in related U.S. Appl. No. 18/024,987.

* cited by examiner

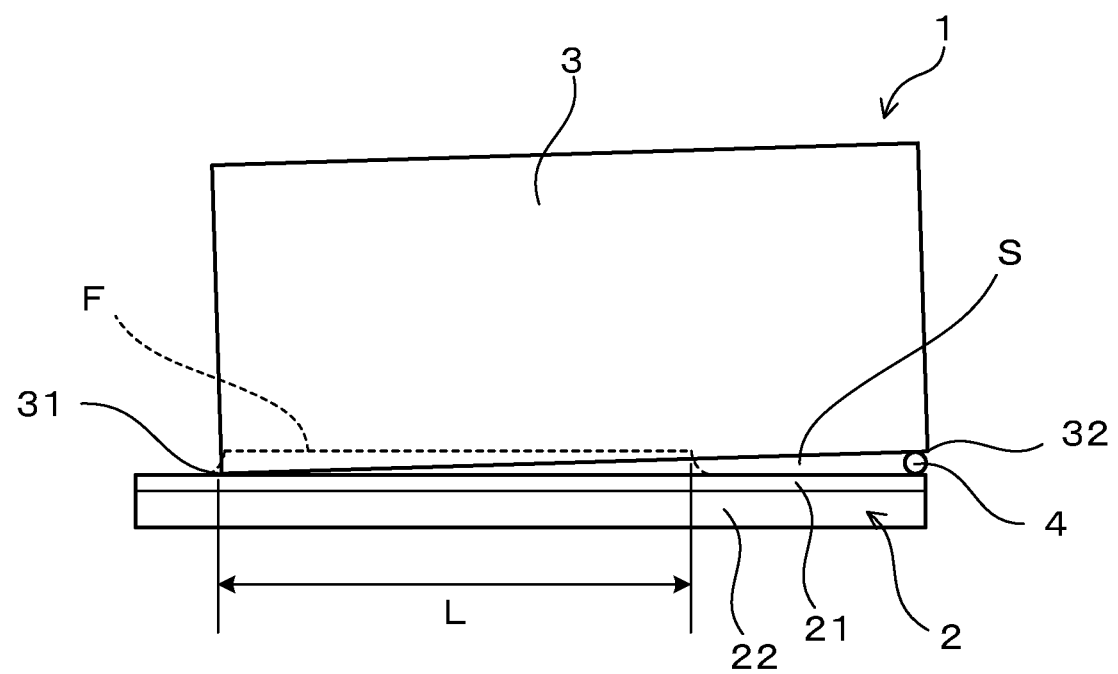

METHOD OF MANUFACTURING A BRAZING SHEET

CROSS-REFERENCE

This application is the US national stage of International Patent Application No. PCT/JP2021/011667 filed on Mar. 22, 2021, which claims priority to Japanese Patent Application No. 2020-069976 filed on Apr. 8, 2020.

TECHNICAL FIELD

The present invention relates to a method of manufacturing a brazing sheet.

BACKGROUND ART

Aluminum products, such as heat exchangers, mechanical parts, and the like, have numerous components composed of aluminum materials (which include aluminum and aluminum alloys; likewise, below). It is often the case that these components are brazed using a brazing sheet that has a core material and a filler material, which is provided on at least one surface of the core material. The core material of the brazing sheet is typically composed of an aluminum alloy whose solidus temperature is 620° C. or higher. In addition, the filler material is composed of an Al—Si (aluminum-silicon) alloy whose solidus temperature is approximately 577° C.

A flux-brazing method is often used as a method of brazing an aluminum material, in which brazing is performed after applying a flux, in advance, to the surfaces of portions to be joined, i.e., the surfaces of portions that are to be joined by brazing. However, in the situation in which brazing is performed using flux-brazing methods, after the brazing has been completed, flux and the residue thereof adhere to the surface of the aluminum product. The flux, the residue thereof, or the like may cause problems depending on the intended use of the aluminum product. Furthermore, to remove the flux, the residue thereof, and the like, it is necessary to perform an acid-washing process, and the cost of such a process has been viewed as a problem in recent years.

To avoid the above-described problems attendant with the use of flux, depending on the intended usage of the aluminum product, so-called vacuum-brazing methods are also used, in which brazing is performed in a vacuum without the application of flux to the surfaces of the portion to be joined. However, vacuum-brazing methods have the problems in that productivity is lower than in flux-brazing methods and the quality of the brazed joint(s) tends to deteriorate. In addition, the equipment cost, the maintenance cost, and the like are higher in brazing furnaces used in vacuum-brazing methods than in standard brazing furnaces.

Accordingly, so-called flux-free-brazing methods, in which brazing is performed in an inert-gas atmosphere without applying flux to the surfaces of the portion to be joined, have been proposed. The core material and the filler material of the brazing sheet used in the flux-free-brazing methods contain metal elements, such as Mg (magnesium), that oxidize more readily than Al (aluminum) does. These metal elements act to break down oxide films present on the brazing sheet itself and on the surface of the opposing material to be joined with the brazing sheet during brazing. In flux-free brazing, the aluminum materials are brazed to each another utilizing the effects of these metal elements.

In addition, in Patent Document 1, a brazing-sheet manufacturing method is proposed in which, after a brazing sheet has been prepared, etching is performed to remove the oxide film(s) present on the surface.

PRIOR ART LITERATURE

Patent Documents

Patent Document 1
Japanese Laid-open Patent Publication No. 2017-505231

SUMMARY OF THE INVENTION

However, the brazing sheet obtained by the manufacturing method described in Patent Document 1 is poor in brazeability owing to the chemical compositions of the core material and the filler material.

It is one non-limiting object of the present teachings to provide a method of manufacturing a brazing sheet that excels in brazeability in flux-free brazing.

In one aspect of the present teachings, a brazing-sheet manufacturing method for brazing an aluminum material in an inert-gas atmosphere without using flux may comprise:
  a layering process in which a clad slab is manufactured that comprises: a core-material slab composed of an aluminum material; and a filler-material slab composed of an Al—Si—Mg series alloy and disposed on at least one surface of the core-material slab;
  a hot-rolling process in which a clad sheet-which comprises: a core material composed of the core-material slab; and a filler material composed of the filler-material slab and disposed on at least one surface of the core-material slab—is manufactured by performing hot rolling on the clad slab;
  a cold-rolling process in which one or more passes of cold rolling are performed on the clad sheet; and
  an etching process in which, between cold-rolling passes in the cold-rolling process or after the completion of the cold-rolling process, a surface of the clad sheet is etched using a liquid etchant that includes an inorganic acid and that does not contain fluorine atoms.

In the above-mentioned brazing-sheet manufacturing method, a clad sheet is manufactured by performing hot rolling and cold rolling on the clad slab. A filler material composed of an Al—Si—Mg series alloy is disposed on at least one surface of the clad sheet. By etching the surface of such a clad sheet using a liquid etchant that includes an inorganic acid and that does not contain fluorine atoms, a brazing sheet that excels in brazeability in flux-free brazing can be obtained.

BRIEF DESCRIPTION OF THE DRAWINGS

FIG. 1 is a side view of a test specimen used in a gap-filling test.

DETAILED DESCRIPTION

<Layering Process>

In the above-mentioned method of manufacturing a brazing sheet, first, a core-material slab, which will ultimately become the core material of a brazing sheet, and a plurality of aluminum slabs, each aluminum slab including a brazing-material slab that will ultimately become the filler material of the brazing sheet, are prepared. Furthermore, a layering process, in which these aluminum slabs are overlaid in a desired order to prepare a clad slab, is performed. The layering order, the number of layers, and the like of the aluminum slabs in the clad slab should be set as appropriate in accordance with the layered structure, the number of layers, and the like of the desired brazing sheet.

For example, in the situation in which the aim is to obtain a brazing sheet having a two-layer structure and comprising a core material and a filler material that is layered on one surface of the core material, the clad slab should comprise two aluminum slabs: a core-material slab and a filler-material slab that is layered on one surface of the core-material slab. Likewise, in the situation in which the aim is to obtain a brazing sheet having a three-layer structure and comprising a core material and filler materials layered on both surfaces of the core material, the clad slab should comprise three aluminum slabs: a core-material slab and filler-material slabs layered on both surfaces of the core-material slab.

In addition, when the aluminum slab is to be prepared, by preparing an aluminum slab having a chemical composition that differs from that of the core-material slab and the filler-material slab and overlaying that aluminum slab with the core-material slab and the filler-material slab to make the clad slab, a brazing sheet having a layer that differs from the core material and the filler material can also be obtained. For example, when preparing the aluminum slab, by preparing an intermediate-material slab having a chemical composition that differs from that of the core-material slab and from that of the filler-material slab and manufacturing the clad slab by overlaying, in order, the core-material slab, the intermediate-material slab, and the filler-material slab, a brazing sheet, in which an intermediate material composed of the intermediate-material slab is ultimately provided between the core material and the filler material, can be obtained. In addition, when preparing the aluminum slab, by preparing a sacrificial-anode-material slab composed of an aluminum alloy having a natural electrode potential that is lower than that of the core-material slab and manufacturing a clad slab by overlaying, in order, the sacrificial-anode-material slab, the core-material slab, and the filler-material slab, a brazing sheet, in which a filler material is ultimately layered on one surface of the core material and a sacrificial-anode material composed of the sacrificial-anode-material slab is ultimately layered on the other surface, can be obtained.

Every aluminum slab included in the clad slab can be manufactured using a usual method. The aluminum slabs included in the clad slab may have the compositions below.
(Core-Material Slab)

The core-material slab is the aluminum slab that, after hot rolling and cold rolling have been performed on the clad slab, will become the core material of the brazing sheet. An aluminum material having a solidus temperature higher than the Al—Si—Mg series alloy that constitutes the filler-material slab can be used as the aluminum material that constitutes the core-material slab. The core-material slab may comprise, for example, a JIS A1000-series aluminum, an A3000-series alloy, an A5000-series alloy, or an A6000-series alloy.

More specifically, the core-material slab may have a chemical composition composed of Al and unavoidable impurities. In addition, the core-material slab may contain, in addition to Al and unavoidable impurities, one or two or more alloying elements selected from the group consisting of Mg (magnesium), Mn (manganese), Si (silicon), Fe (iron), Cu (copper), Zn (zinc), Ti (titanium), Cr (chrome), and Zr (zirconium). It is noted that the chemical composition of the core material in the brazing sheet is the same as the chemical composition of the core-material slab.

Mg: 0.10 Mass % or More and 4.0 Mass % or Less

The aluminum alloy that constitutes the core-material slab may contain 0.10 mass % or more and 4.0 mass % or less of Mg. In this situation, a brazing sheet comprising a core material composed of an aluminum alloy that contains Mg can be obtained. Mg in the core material diffuses owing to heating during brazing and moves into the filler material. Furthermore, owing to the Mg that has moved into the filler material, together with the Mg in the filler material, breaking down the oxide films present on the surface of the filler material and on the surface of the opposing material, brazeability in flux-free brazing can be further improved.

From the viewpoint of further improving brazeability in flux-free brazing, the amount of Mg in the core-material slab is preferably set to 0.20 mass % or more, more preferably set to 0.30 mass % or more, and yet more preferably set to 0.40 mass % or more.

On the other hand, if the Mg content in the core-material slab becomes excessive, then the amount of Mg that reaches the surface of the filler material during brazing will tend to become large. If this Mg oxidizes on the surface of the filler material, there is a risk that it will lead to degradation in brazeability. By setting the Mg content in the core-material slab to 4.0 mass % or less, preferably to 1.5 mass % or less, and yet more preferably to 1.0 mass % or less, the amount of Mg oxides formed during brazing is further reduced and, in turn, degradation in brazeability can be avoided.

Mn: 0.05 Mass % or More and 1.60 Mass % or Less

The aluminum alloy that constitutes the core-material slab may contain 0.05 mass % or more and 1.60 mass % or less of Mn. In this situation, a brazing sheet comprising a core material composed of an aluminum alloy that contains Mn can be obtained.

By setting the Mn content in the core-material slab to 0.05 mass % or more, preferably to 0.30 mass % or more, and yet more preferably to 0.60 mass % or more, the strength of the core material in the brazing sheet can be further increased, the electric potential of the core material can be adjusted, and corrosion resistance can be further improved.

However, if the Mn content in the core-material slab becomes excessive, then cracks in the core material will tend to occur in the process of manufacturing the brazing sheet. By setting the Mn content in the core-material slab to 1.6 mass % or less and preferably to 1.4 mass % or less, degradation in the manufacturability of the brazing sheet can be avoided.

Si: Greater than 0 Mass % and 1.0 Mass % or Less

The aluminum alloy that constitutes the core-material slab may contain greater than 0 mass % and 1.0 mass % or less of Si. In this situation, a brazing sheet comprising a core material composed of an aluminum alloy that contains Si can be obtained. Si in the core material of the brazing sheet acts to increase the strength of the core material. However, if the Si content in the core material becomes excessive, then there is a risk that the melting point of the core material will decrease, which will lead to degradation in brazeability. By setting the Si content in the core-material slab to 1.0 mass % or less, preferably to 0.7 mass % or less, and more preferably to 0.5 mass % or less, the strength of the core material can be further increased while avoiding degradation in brazeability.

Fe: Greater than 0 Mass % and 1.0 Mass % or Less

The aluminum alloy that constitutes the core-material slab may contain greater than 0 mass % and 1.0 mass % or less of Fe. In this situation, a brazing sheet comprising a core material composed of an aluminum alloy that contains Fe can be obtained. Fe in the core material of the brazing sheet acts to increase the strength of the core material. However, if the Fe content in the core material becomes excessive, then there is a risk that it will lead to degradation in the corrosion resistance of the core material. In addition, in this situation, there is also a risk that very large precipitates will tend to form in the core material, which will lead to a decrease in the ductility of the brazing sheet. By setting the Fe content in the core-material slab to 1.0 mass % or less, preferably to 0.7 mass % or less, and more preferably to 0.5 mass % or less, the strength of the core material can be further increased while avoiding these problems.

Cu: Greater than 0 Mass % and 2.0 Mass % or Less

The aluminum alloy that constitutes the core-material slab may contain greater than 0 mass % and 2.0 mass % or less of Cu. In this situation, a brazing sheet comprising a core material composed of an aluminum alloy that contains Cu can be obtained. Cu in the core material acts to increase the strength of the core material. In addition, Cu acts to adjust the electric potential of the core material and to improve corrosion resistance. However, if the Cu content in the core material becomes excessive, then intergranular corrosion will tend to occur. In addition, in this situation, there is a risk that the melting point of the core material will decrease, which will lead to degradation in brazeability. By setting the Cu content in the core-material slab to 2.0 mass % or less, preferably to 1.0 mass % or less, and more preferably to 0.5 mass % or less, the strength and corrosion resistance of the core material can be further increased while avoiding these problems.

Zn: Greater than 0 Mass % and 6.5 Mass % or Less

The aluminum alloy that constitutes the core-material slab may contain greater than 0 mass % and 6.5 mass % or less of Zn. In this situation, a brazing sheet comprising a core material composed of an aluminum alloy that contains Zn can be obtained. Zn in the core material acts to lower the natural electrode potential of the core material. By lowering the natural potential of the core material, the core material can be caused to function as a sacrificial anode in the aluminum product after brazing. However, if the Zn content becomes excessive, then there is a risk that the natural electrode potential of the core material will decrease excessively, which will diminish the sacrificial corrosion-inhibiting effect at an early stage. By setting the Zn content in the core-material slab to 6.5 mass % or less, the sacrificial corrosion-inhibiting effect due to the core material can be maintained over a longer term.

Ti: Greater than 0 Mass % and 0.20 Mass % or Less

The aluminum alloy that constitutes the core-material slab may contain greater than 0 mass % and 0.20 mass % or less of Ti. In this situation, a brazing sheet comprising a core material composed of an aluminum alloy that contains Ti can be obtained. Ti in the core material acts to cause corrosion in the core material to advance in a laminar manner and to curtail the advancement of corrosion in the depth direction. However, if the Ti content becomes excessive, then there is a risk that very large precipitates will tend to form in the core-material slab, which will lead to degradation in rollability during hot rolling and cold rolling. In addition, in this situation, there is also a risk that it will lead instead to degradation in the corrosion resistance of the core material. By setting the Ti content in the core-material slab to 0.20 mass % or less, the advancement of corrosion in the depth direction of the core material can be curtailed more effectively while avoiding these problems.

Cr: Greater than 0 Mass % and 0.50 Mass % or Less

The aluminum alloy that constitutes the core-material slab may contain greater than 0 mass % and 0.50 mass % or less of Cr. In this situation, a brazing sheet comprising a core material composed of an aluminum alloy that contains Cr can be obtained. Cr acts to increase the grain size of the core material and to curtail the occurrence of erosion. However, if the Cr content in the core-material slab becomes excessive, then cracks in the core material tend to occur in the process of manufacturing the brazing sheet. By setting the Cr content in the core-material slab to 0.50 mass % or less, the occurrence of erosion can be curtailed more effectively while avoiding degradation in the manufacturability of the brazing sheet.

Zr: greater than 0 mass % and 0.50 mass % or less

The aluminum alloy that constitutes the core-material slab may contain greater than 0 mass % and 0.50 mass % or less of Zr. In this situation, a brazing sheet comprising a core material composed of an aluminum alloy that contains Zr can be obtained. Zr acts to increase the grain size of the core material and to curtail the occurrence of erosion. However, if the Zr content in the core-material slab becomes excessive, then cracks in the core material tend to occur in the process of manufacturing the brazing sheet. By setting the Zr content in the core material to 0.50 mass % or less, the occurrence of erosion can be curtailed more effectively while avoiding degradation in the manufacturability of the brazing sheet.

(Filler-Material Slab)

The filler-material slab is the aluminum slab that becomes the filler material of the brazing sheet after hot rolling and cold rolling have been performed on the clad slab. Al—Si—Mg series alloys, which are aluminum alloys that contain Mg and Si, can be used as the aluminum material that constitutes the filler-material slab. The filler-material slab may be composed of an Al—Si—Mg series alloy having a chemical composition that contains, for example, Si: 3.0 mass % or more and 13.0 mass % or less and Mg: 0.10 mass % or more and 2.0 mass % or less, the remainder being Al and unavoidable impurities. It is noted that the chemical composition of the filler material of the brazing sheet is the same as the chemical composition of the filler-material slab.

Si: 3.0 Mass % or More and 13.0 Mass % or Less

The Al—Si—Mg series alloy that constitutes the filler-material slab may contain 3.0 mass % or more and 13.0 mass % or less of Si. By setting the Si content in the filler-material slab to the above-mentioned specific range, brazeability in flux-free brazing can be further improved.

Mg: 0.10 Mass % or More and 2.0 Mass % or Less

The Al—Si—Mg series alloy that constitutes the filler-material slab may contain 0.10 mass % or more and 2.0 mass % or less of Mg. Mg in the filler material acts to break down the oxide films present on the surface of the filler material and the surface of the opposing material during brazing. By setting the Mg content in the filler-material slab to 0.10 mass % or more and more preferably to 0.20 mass % or more, the oxide films present on the surface of the filler material and the surface of the opposing material can be sufficiently broken down, and thereby brazeability in flux-free brazing can be further improved.

On the other hand, if the amount of Mg in the filler material becomes excessive, then Mg oxides tend to form on the surface of the brazing sheet. If the Mg oxides become excessive, then there is a risk that it will lead to degradation in brazeability. By setting the Mg content in the filler-material slab to 2.0 mass % or less and more preferably to 1.5 mass % or less, the amount of Mg oxides formed on the surface of the brazing sheet can be further reduced and, in turn, degradation in brazeability can be avoided.

The aluminum alloy that constitutes the filler-material slab may contain as an essential component, in addition to Si and Mg, one or two or more alloying elements selected from the group consisting of Bi (bismuth), Li (lithium), Cu, Zn, Sn (tin), In (indium), Sr (strontium), Na (sodium), and Sb (antimony).

Bi: 0 Mass % or More and 1.0 Mass % or Less

The aluminum alloy that constitutes the filler-material slab may contain 1.0 mass % or less of Bi as an optional component. In this situation, a brazing sheet comprising a filler material composed of an Al—Si—Mg series alloy that contains Bi can be obtained. Bi acts to reduce the surface tension of the molten filler formed during brazing. By setting the Bi content in the filler-material slab preferably to 0.05 mass % or more and more preferably to 0.10 mass % or more, brazeability can be further improved.

However, if the Bi content in the filler-material slab becomes excessive, then it becomes difficult to obtain the effect of improving brazeability commensurate with the Bi content. In addition, in this situation, there is a risk that the filler material after brazing will tend to discolor, resulting in a defective external appearance. By setting the Bi content in the filler-material slab to 1.0 mass % or less, preferably to 0.70 mass % or less, and more preferably to 0.50 mass % or less, brazeability can be further improved while avoiding these problems.

Li: 0.0010 Mass % or More and 0.30 Mass % or Less

The Al—Si—Mg series alloy that constitutes the filler-material slab may contain 0.0010 mass % or more and 0.30 mass % or less of Li. In this situation, a brazing sheet comprising a filler material composed of an Al—Si—Mg series alloy that contains Li can be obtained. Li in the filler material acts to break down the oxide films present on the surface of the filler material and the surface of the opposing material during brazing.

By setting the Li content in the filler-material slab to 0.0010 mass % or more and more preferably to 0.0040 mass % or more, brazeability in flux-free brazing can be further improved.

However, if the Li content in the filler-material slab becomes excessive, then Li oxides tend to form on the surface of the brazing sheet. If the Li oxides become excessive, then there is a risk that it will lead to degradation in brazeability. By setting the Li content in the filler-material slab to 0.30 mass % or less and more preferably to 0.10 mass % or less, degradation in brazeability due to oxidation of Li can be avoided.

Cu: Greater than 0 Mass % and 2.0 Mass % or Less

The Al—Si—Mg series alloy that constitutes the filler-material slab may contain greater than 0 mass % and 2.0 mass % or less of Cu. In this situation, a brazing sheet comprising a filler material composed of an Al—Si—Mg series alloy that contains Cu can be obtained. Cu in the filler material acts to raise the natural electrode potential of the filler material as well as to lower the melting point. By setting the Cu content in the filler-material slab to the above-mentioned specific range, the natural electrode potential of the filler material can be suitably raised, and thereby the corrosion resistance of the filler material can be improved. In addition, by setting the Cu content in the filler-material slab to the above-mentioned specific range, the fluidity of the molten filler can be increased, and thereby brazeability can be further improved.

Zn: Greater than 0 Mass % and 6.5 Mass % or Less, Sn: Greater than 0 Mass % and 0.10 Mass % or Less, and in: Greater than 0 Mass % and 0.10 Mass % or Less The Al—Si—Mg series alloy that constitutes the filler-material slab may contain one or two or more elements selected from the group consisting of greater than 0 mass % and 6.5 mass % or less of Zn, greater than 0 mass % and 0.10 mass % or less of Sn, and greater than 0 mass % and 0.10 mass % or less of In. Zn, Sn, and In in the filler material each act to lower the natural electrode potential of the filler material. By setting the Zn content, the Sn content, and the In content in the filler-material slab to the above-mentioned specific ranges, the filler material can be caused to function as a sacrificial anode, and thereby the corrosion resistance of the aluminum product after brazing can be further improved.

Sr: Greater than 0 Mass % and 0.030 Mass % or Less, Na: Greater than 0 Mass % and 0.030 Mass % or Less, and Sb: Greater than 0 Mass % and 0.030 Mass % or Less The Al—Si—Mg series alloy that constitutes the filler-material slab may contain one or two or more elements selected from the group consisting of greater than 0 mass % and 0.030 mass % or less of Sr, greater than 0 mass % and 0.030 mass % or less of Na, and greater than 0 mass % and 0.030 mass % or less of Sb. Sr, Na, and Sb in the filler material each act to increase the fineness of the Si particles in the filler material, thereby improving the fluidity of the molten filler. By setting the Sr content, the Na content, and the Sb content in the filler-material slab to the above-mentioned specific ranges, the fluidity of the molten filler increases, and thereby brazeability can be further improved.

(Intermediate-Material Slab)

When the above-mentioned clad slab is to be prepared, by disposing an intermediate-material slab between the core-material slab and the filler-material slab, a brazing sheet can be obtained in which an intermediate material composed of the intermediate-material slab is provided between the core material and the filler material. For example, an aluminum alloy having a chemical composition that differs from those of the core-material slab and the filler-material slab can be used as the aluminum alloy that constitutes the intermediate-material slab. It is noted that the chemical composition of the intermediate material is the same as the chemical composition of the intermediate-material slab.

Mg: 0.40 Mass % or More and 6.0 Mass % or Less

The aluminum alloy that constitutes the intermediate-material slab may have, for example, a chemical composition that contains 0.40 mass % or more and 6.0 mass % or less of Mg, the remainder being Al and unavoidable impurities. By disposing such an intermediate-material slab between the core-material slab and the filler-material slab in the clad slab, a brazing sheet can be obtained in which an intermediate material that contains Mg is provided between the core material and the filler material.

Mg in the intermediate material diffuses owing to heating during brazing and moves into the filler material, the same as Mg in the core material. Furthermore, owing to the Mg that has moved into the filler material, together with the Mg in the filler material, breaking down the oxide films present on the surface of the filler material and the surface of the opposing material, brazeability in flux-free brazing can be further improved. From the viewpoint of further improving brazeability in flux-free brazing, the Mg content in the intermediate-material slab is preferably set to the above-mentioned specific range.

The intermediate-material slab may contain, in addition to Al and unavoidable impurities, one or two or more selected from the group consisting of Mn, Si, Fe, Cu, Zn, Ti, Cr, and Zr.

Mn: Greater than 0 Mass % and 2.0 Mass % or Less

The aluminum alloy that constitutes the intermediate-material slab may contain greater than 0 mass % and 2.0 mass % or less of Mn. In this situation, a brazing sheet comprising an intermediate material composed of an aluminum alloy that contains Mn can be obtained. By setting the Mn content in the intermediate-material slab to the above-mentioned specific range, the strength of the intermediate material in the brazing sheet can be further increased, the electric potential of the intermediate material can be adjusted, and corrosion resistance can be further improved.

Si: Greater than 0 Mass % and 1.0 Mass % or Less

The aluminum alloy that constitutes the intermediate-material slab may contain greater than 0 mass % and 1.0 mass % or less of Si. In this situation, a brazing sheet comprising an intermediate material composed of an aluminum alloy that contains Si can be obtained. By setting the Si content in the intermediate-material slab to the above-mentioned specific range, the strength of the intermediate material of the brazing sheet can be further increased.

Fe: Greater than 0 Mass % and 1.0 Mass % or Less

The aluminum alloy that constitutes the intermediate-material slab may contain greater than 0 mass % and 1.0 mass % or less of Fe. In this situation, a brazing sheet comprising an intermediate material composed of an aluminum alloy that contains Fe can be obtained. By setting the Fe content in the intermediate-material slab to the above-mentioned specific range, the strength of the intermediate material of the brazing sheet can be further increased.

Cu: Greater than 0 Mass % and 2.0 Mass % or Less

The aluminum alloy that constitutes the intermediate-material slab may contain greater than 0 mass % and 2.0 mass % or less of Cu. In this situation, a brazing sheet comprising an intermediate material composed of an aluminum alloy that contains Cu can be obtained. By setting the Cu content in the intermediate-material slab to the above-mentioned specific range, the strength of the intermediate material in the brazing sheet can be further increased, the electric potential of the intermediate material can be adjusted. In addition, in this situation, corrosion resistance can be further improved.

Zn: Greater than 0 Mass % and 6.5 Mass % or Less

The aluminum alloy that constitutes the intermediate-material slab may contain greater than 0 mass % and 6.5 mass % or less of Zn. In this situation, a brazing sheet comprising an intermediate material composed of an aluminum alloy that contains Zn can be obtained. Zn in the intermediate material acts to lower the natural electrode potential of the intermediate material, the same as Zn in the core material. By setting the Zn content in the intermediate-material slab to the above-mentioned specific range, the intermediate material can be caused to function as a sacrificial anode, and thereby corrosion resistance can be further improved.

Ti: Greater than 0 Mass % and 0.20 Mass % or Less

The aluminum alloy that constitutes the intermediate-material slab may contain greater than 0 mass % and 0.20 mass % or less of Ti. In this situation, a brazing sheet comprising an intermediate material composed of an aluminum alloy that contains Ti can be obtained. By setting the Ti content in the intermediate-material slab to the above-mentioned specific range, corrosion of the intermediate material can be caused to advance in a laminar manner, and thereby the advancement of corrosion in the depth direction can be curtailed more effectively.

Cr: Greater than 0 Mass % and 0.50 Mass % or Less, Zr: Greater than 0 Mass % and 0.50 Mass % or Less The aluminum alloy that constitutes the intermediate-material slab may contain one or two elements selected from the group consisting of greater than 0 mass % and 0.50 mass % or less of Cr and greater than 0 mass % and 0.50 mass % or less of Zr. Cr and Zr act to increase the grain size of the intermediate material. By setting the Cr content and the Zr content in the intermediate-material slab to the above-mentioned specific ranges, the occurrence of erosion can be curtailed more effectively.

(Sacrificial-Anode-Material Slab)

When the above-mentioned clad slab is to be prepared, by disposing the filler-material slab on one surface of the core-material slab and disposing the sacrificial-anode-material slab on the other surface, a brazing sheet can be obtained in which filler material is provided on one surface of the core material and sacrificial-anode material is provided on the other surface. For example, an aluminum alloy in which the natural electrode potential is lower than that of the aluminum material that constitutes the core material can be used as the aluminum alloy that constitutes the sacrificial-anode-material slab. It is noted that the chemical composition of the sacrificial-anode material is the same as the chemical composition of the sacrificial-anode-material slab.

Zn: Greater than 0 Mass % and 6.5 Mass % or Less, Sn: Greater than 0 Mass % and 0.10 Mass % or Less, in: Greater than 0 Mass % and 0.10 Mass % or Less The aluminum alloy that constitutes the sacrificial-anode-material slab may have a chemical composition that, for example, contains one or two or more elements selected from the group consisting of greater than 0 mass % and 6.50 mass % or less of Zn, greater than 0 mass % and 0.10 mass % or less of Sn, and greater than 0 mass % and 0.10 mass % or less of In, the remainder being Al and unavoidable impurities. In this situation, a brazing sheet comprising a sacrificial-anode material composed of an aluminum alloy that contains Zn, Sn, and In can be obtained.

Zn, Sn, and In in the sacrificial-anode material act to lower the natural electrode potential of the sacrificial-anode material. By setting the Zn content, the Sn content, and the In content in the sacrificial-anode material to the above-mentioned specific ranges, corrosion resistance of the aluminum product after brazing can be further improved.

<Hot-Rolling Process>

In the method of manufacturing the above-mentioned brazing sheet, after the layering process, a hot-rolling process is performed. In the hot-rolling process, hot rolling is performed on the clad slab obtained in the layering process. Thereby, a clad sheet can be obtained in which adjacent aluminum slabs are joined to each other. The rolling conditions in the hot-rolling process should be set as appropriate in accordance with the configuration of the clad slab, the configuration of the brazing sheet to be ultimately obtained, etc. In addition, after the hot-rolling process, a homogenization process may be performed by heating the clad sheet as needed.

<Cold-Rolling Process>

After the hot-rolling process, a cold-rolling process is performed in which one or more passes of cold rolling are performed on the obtained clad sheet. By cold rolling the clad sheet, the thickness of the clad sheet can be reduced to the desired thickness of the brazing sheet. The number of passes, the rolling conditions, and the like in the cold-rolling process should be set as appropriate in accordance with the composition of the clad sheet, the composition of the desired brazing sheet, etc. In addition, annealing may be performed by heating the clad sheet as needed prior to performing the cold rolling, during the cold rolling, or after the cold rolling has been performed.

<Etching Process>

When the hot rolling and the heat treatment described above are performed, an oxide film, which has formed owing to the temperature of the clad sheet and the brazing sheet having become high, is present on the surface of the brazing sheet obtained by the cold rolling. Because this oxide film is made brittle, in the etching process, etching is performed by bringing a liquid etchant into contact with the surface of the brazing sheet. The etching process may be performed between cold rolling passes in the cold-rolling process or may be performed after the cold-rolling process has completed. In the situation in which the etching process is performed after the cold-rolling process has completed, etching may be performed in a coil-material state prior to the coil material being cut to the desired size, or etching may be performed after processing, such as cutting and pressing, has been performed to form the brazing sheet into the desired shape.

In the above-mentioned etching process, an aqueous solution that includes an inorganic acid and that does not contain fluorine atoms can be used as the liquid etchant. As described above, the filler material of the brazing sheet may contain Mg as an essential component. Consequently, if fluorine atoms are present in the liquid etchant, then the fluorine atoms and the Mg in the filler material react, and thereby a compound that contains Mg and fluorine atoms is formed on the surface of the filler material. Because this compound acts to hinder breakdown of the oxide film due to Mg during brazing, if etching is performed using a liquid etchant that contains fluorine atoms, there is a risk that brazeability will decrease.

In contrast, because the above-mentioned liquid etchant does not contain fluorine atoms, the formation of a fluorine-atom residue or a compound of fluorine atoms and Mg on the surface of the brazing sheet can be avoided. For this reason, by performing etching using the above-mentioned specific liquid etchant, the brazeability of the brazing sheet in which the filler material contains Mg can be further improved.

For example, sulfuric acid, nitric acid, phosphoric acid, or the like can be used as the inorganic acid included in the liquid etchant. These inorganic acids may be used singly, or two or more may be used in combination. From the viewpoint of further improving the brazeability of the brazing sheet, the liquid etchant preferably contains sulfuric acid as the inorganic acid and more preferably contains both sulfuric acid and nitric acid. The concentration of the sulfuric acid in the liquid etchant is preferably 0.10 mass % or more and 4.0 mass % or less and more preferably 0.20 mass % or more and 2.0 mass % or less. In addition, the concentration of the nitric acid in the liquid etchant is preferably 0.02 mass % or more and 0.50 mass % or less.

The liquid etchant may contain, in addition to an inorganic acid, a salt that contains iron ions. For example, ferric sulfate, iron nitrate, iron perchlorate, or the like can be used as such a salt. These salts may be used singly, or two or more may be used in combination. By performing etching using a liquid etchant that contains an inorganic acid and an iron-ion-containing salt, the storage stability of the brazing sheet can be further improved and a reduction in brazeability during storage can be curtailed for a longer term. In addition, in this situation, a decrease in brazeability during storage can be curtailed over a longer term even without applying an oil, such as a rolling oil, to the surface of the brazing sheet after etching has been performed.

Ferric sulfate is preferably used as the salt that contains iron ions. In this situation, the concentration of the ferric sulfate in the liquid etchant is preferably 0.05 mass % or more and 1.0 mass % or less and more preferably 0.10 mass % or more and 1.0 mass % or less.

From the viewpoint of further improving the brazeability of the brazing sheet and further improving the storage stability of the brazing sheet, the liquid etchant in particular preferably contains 0.20 mass % or more and 2.0 mass % or less of sulfuric acid, 0.02 mass % or more and 0.50 mass % or less of nitric acid, and 0.10 mass % or more and 1.0 mass % or less of ferric sulfate.

The liquid etchant preferably further contains at least one from among a surfactant and a reaction accelerator, and more preferably contains both. By performing the etching using a liquid etchant that contains a surfactant, a reaction accelerator, or the like, the time needed for etching can be further shortened, the occurrence of nonuniformity in the reaction can be curtailed, and the entire brazing sheet can be etched evenly.

In the etching described above, the thickness of the oxide film present on the surface of the brazing sheet may be made thinner than that before etching, or the oxide film may be removed entirely. In the situation of the former, because the thickness of the oxide film after etching becomes thinner than that prior to etching, the oxide film after etching can be made more brittle than before etching. In addition, in the situation of the latter, by bringing the surface of the clad sheet after the oxide film has been removed into contact with outside air, an oxide film is formed on the surface of the filler material. However, the oxide film formed in this manner is more brittle than the oxide film formed in the process of manufacturing the clad sheet, i.e., the oxide film present prior to etching.

Accordingly, by etching the surface of the clad sheet, the oxide film present on the surface of the filler material can be made brittle. Furthermore, by making the oxide film brittle, the oxide film can be easily fragmented during brazing. As a result, brazeability in flux-free brazing can be further improved.

The amount of etching in the etching process, i.e., the amount of increase or decrease in the mass of the brazing sheet due to etching, is preferably 0.05 $g/m^2$ or more and 1 $g/m^2$ or less. By setting the etching amount to 0.05 $g/m^2$ or more and more preferably to 0.1 $g/m^2$ or more, the oxide films present on the surface of the clad sheet can be made sufficiently brittle, and thereby the oxide films can be easily fragmented during brazing. In addition, by setting the etching amount to 1 $g/m^2$ or less and more preferably to 0.5 $g/m^2$ or less, the oxide films can be made sufficiently brittle while at the same time the time needed for etching can be reduced and the productivity of the brazing sheet can be further increased.

The brazing sheet obtained by the above-mentioned manufacturing method can be used in flux-free brazing, that is, in brazing that is performed in an inert-gas atmosphere without the application of flux. For example, nitrogen, argon, helium, or the like can be used as the inert gas.

In flux-free brazing, if the oxygen concentration and the dew point in the inert-gas atmosphere are excessively high, then there is a risk that it will lead to degradation in brazeability. However, with regard to the above-mentioned brazing sheet, because the oxide films present on the surface of the filler material are made brittle in advance as described above, degradation in brazeability can be avoided even in the situation in which the oxygen concentration and the dew point in the brazing atmosphere are relatively high. With regard to the above-mentioned brazing sheet, for example, flux-free brazing can be performed in an inert-gas atmosphere in which the oxygen concentration is 100 vol. ppm or less and the dew point is −30° C. or lower.

Although the heating conditions in flux-free brazing are not particularly limited, if the time needed from the start of when heating when brazing is being performed until the filler material melts is excessively long, then oxidation of the surface of the filler material will progress, and therefore there is a risk that it will lead to degradation in brazeability. From the viewpoint of avoiding such problems, brazing is preferably performed under heating conditions in which the time needed from when the temperature of the brazing sheet reaches 300° C. until the temperature of the brazing sheet reaches the solidus temperature of the filler material is 40 min or less.

WORKING EXAMPLES

Working examples of the method of manufacturing the brazing sheet are explained below. It is noted that the aspects of the method of manufacturing the brazing sheet according to the present invention are not limited to the aspects of the working examples described below, and the constitutions can be modified as appropriate within a range that does not depart from the gist thereof.

The chemical compositions of filler-material slabs A1-A3 and core-material slab B1 used in the present example are as listed in Table 1. These filler-material slabs and the core-material slab can be manufactured by usual methods. It is noted that the symbol "Bal" in Table 1 is a symbol that indicates the remainder, and the symbol "−" is a symbol that indicates that the particular alloying element is not actively added.

brazing sheet. Subsequently, a liquid etchant having a composition as listed in Table 2 was brought into contact with the brazing sheet to etch the surface of the brazing sheet (etching process). The temperature of the liquid etchant brought into contact with the brazing sheet and the time of contact with the liquid etchant were as listed in Table 2. After the etching was completed, the brazing sheet was rinsed to remove the liquid etchant, and subsequently the brazing sheet was dried. It is noted that the symbol "−" in Table 2 is a symbol that indicates that the particular component was not included.

The brazeability of brazing sheets C1-C14 obtained as above could be evaluated using a gap-filling test. In the gap-filling test, first, a test specimen 1 shown in FIG. 1 was assembled. As shown in FIG. 1, the test specimen 1 comprises: a horizontal sheet 2, which is composed of a brazing sheet C1-C14; and a perpendicular sheet 3, which is composed of a JIS A3003 alloy and has a sheet thickness of 1.0 mm. The horizontal sheet 2 is disposed horizontally such that a filler material 21 is oriented upward and a core material 22 is oriented downward. The perpendicular sheet 3 is disposed such that it is orthogonal to the horizontal sheet 2. In addition, one end 31 of the perpendicular sheet 3 in a longitudinal direction makes contact with the filler material 21 of the horizontal sheet 2. It is noted that the width of the horizontal sheet 2 is 25 mm and the length is 60 mm. In addition, the width of the perpendicular sheet 3 is 25 mm and the length is 55 mm.

A spacer 4 was interposed between other end 32 of the perpendicular sheet 3 in the longitudinal direction and the horizontal sheet 2. Thereby, a gap S, which gradually widened from the one end 31 of the perpendicular sheet 3 toward the spacer 4 side, was formed between the horizontal sheet 2 and the perpendicular sheet 3. The spacer 4 was, specifically, a round wire that was made of stainless steel having a diameter of 1.6 mm and was disposed at a location at which it was separated by 55 mm in the horizontal

TABLE 1

| | | Chemical Composition (mass %) | | | | | | | | | |
|---|---|---|---|---|---|---|---|---|---|---|---|
| | | Si | Fe | Cu | Mn | Mg | Cr | Ti | Zn | Bi | Al |
| Filler-material slab | A1 | 11.5 | 0.30 | <0.02 | <0.05 | 0.60 | <0.02 | <0.02 | <0.05 | 0.30 | Bal. |
| | A2 | 11.5 | 0.30 | <0.02 | <0.05 | <0.05 | <0.02 | <0.02 | <0.05 | 0.30 | Bal. |
| | A3 | 10 | 0.30 | <0.02 | <0.05 | 0.60 | <0.02 | <0.02 | <0.05 | 0.30 | Bal. |
| Core-material slab | B1 | 0.2 | 0.15 | 0.12 | 1.20 | 0.60 | <0.02 | 0.11 | <0.05 | — | Bal. |

Working Example 1

First, a clad slab was manufactured by overlaying either filler-material slab A1 or A2 on one surface of core-material slab B1 (layering process). Hot rolling was performed on this clad slab, and thereby a clad sheet in which a filler material was layered on one surface of a core material was manufactured (hot-rolling process). The thickness of the clad sheet was set to 3.0 mm.

One or more passes of cold rolling are performed on this clad sheet; by subsequently annealing, a brazing sheet having a thickness of 0.8 mm is manufactured (cold-rolling process). The clad percentage of the filler material of the obtained brazing sheet, i.e., the ratio of the thickness of the filler material to the thickness of the brazing sheet, was set to 8%.

After the cold rolling, the brazing sheet was degreased and cleaned to remove rolling oil from the surface of the direction from the location (i.e., the one end 31 of the perpendicular sheet 3) at which the perpendicular sheet 3 is in contact with the horizontal sheet 2.

The brazing of the test specimen was performed using a nitrogen-gas furnace. Specifically, first, the atmosphere in the furnace was set to a nitrogen-gas atmosphere having an oxygen concentration of 10 vol. ppm or less, and the test specimen was disposed in the furnace in the state in which the in-furnace temperature was 100° C. or lower. After leaving the test specimen in the furnace for 10 min, brazing heating was started. Brazing heating was performed by raising the temperature of the test specimen to a temperature of 600° C. and then maintaining the temperature of 600° C. for 3 min. After brazing heating was completed, the test specimen was cooled in the furnace until the temperature fell to a certain extent, after which the test specimen was removed from the furnace.

In the gap-filling test, brazeability was evaluated based on the length L and the shape of a fillet F formed after brazing (refer to FIG. 1). Length L of the fillet F in the test specimens in which the brazing sheets were used are shown in Table 2.

TABLE 2

| Brazing Sheet | Core Material | Filler Material | Composition of Liquid Etchant (mass %) | | | | Etching Conditions | | Fillet Length (mm) |
|---|---|---|---|---|---|---|---|---|---|
| | | | Sulfuric Acid | Nitric Acid | Ferric Sulfate | Hydrofluoric Acid | Temperature (° C.) | Time (sec) | |
| C1 | B1 | A1 | 0.55 | 0.06 | 0.15 | — | 80 | 10 | 34.4 |
| C2 | B1 | A1 | 0.96 | 0.11 | 0.26 | — | 80 | 5 | 33.0 |
| C3 | B1 | A1 | 0.96 | 0.11 | 0.26 | — | 80 | 10 | 30.4 |
| C4 | B1 | A1 | 0.96 | 0.11 | 0.26 | — | 80 | 15 | 37.0 |
| C5 | B1 | A1 | 1.40 | 0.15 | 0.35 | — | 80 | 10 | 30.9 |
| C6 | B1 | A1 | 1.90 | 0.21 | 0.53 | — | 80 | 10 | 36.5 |
| C7 | B1 | A1 | 2.80 | 0.30 | 0.70 | — | 80 | 10 | 34.5 |
| C8 | B1 | A1 | 0.28 | 0.03 | 0.07 | — | 80 | 10 | 37.6 |
| C9 | B1 | A1 | 1.90 | — | — | — | 80 | 10 | 39.0 |
| C10 | B1 | A1 | 1.90 | 0.24 | — | — | 80 | 10 | 37.9 |
| C11 | B1 | A1 | 3.70 | 0.47 | — | — | 80 | 10 | 35.3 |
| C12 | B1 | A1 | 0.96 | 0.11 | 0.26 | 0.10 | 80 | 10 | 25.5 |
| C13 | B1 | A1 | 1.90 | 0.24 | — | 0.06 | 80 | 10 | 27.2 |
| C14 | B1 | A2 | 1.90 | 0.24 | — | — | 80 | 10 | 3.0 |

As shown in Table 2, it was possible to make fillet length L of brazing sheets C1-C11, which were etched using liquid etchants that contained an inorganic acid but did not contain fluorine atoms, longer than brazing sheets C12, C13, which were etched using liquid etchants that contained fluorine atoms.

With regard to brazing sheet C14, in which the filler material did not contain Mg, because the breakdown of oxide films due to Mg was insufficient, brazeability could not be improved, even if etching was performed using a liquid etchant that did not contain fluorine.

Based on these results, it could be understood that brazeability in flux-free brazing could be improved by etching a brazing sheet comprising a filler material composed of an Al—Mg—Si series alloy using a liquid etchant that contained an inorganic acid but did not contain fluorine atoms.

Working Example 2

In the present example, the storage stability of the brazing sheets was evaluated. First, a clad slab was manufactured by overlaying filler-material slab A3 on one surface of core-material slab B1 shown in Table 1 (layering process). Hot rolling is performed on this clad slab and a clad sheet having a thickness of 3.0 mm (hot-rolling process) is manufactured. Subsequently, by performing cold rolling on the clad sheet, a brazing sheet having a thickness of 0.4 mm was obtained (cold-rolling process). The clad percentage of the filler material of the obtained brazing sheet was set to 10%.

After cold rolling, the brazing sheet was annealed. Next, the brazing sheet was degreased and cleaned to remove rolling oil from the surface of the brazing sheet. Subsequently, a liquid etchant having a composition shown in Table 3 was brought into contact with the brazing sheet to etch the surface of the brazing sheet (etching process). The temperature of the liquid etchant brought into contact with the brazing sheet and the time of contact with the liquid etchant were as shown in Table 3. After etching was completed, the brazing sheet was rinsed to remove the liquid etchant and then the brazing sheet was dried. Based on the above, brazing sheets D1-D4 were obtained. It is noted that the symbol "–" in Table 3 is a symbol that indicates that the particular component was not included.

In the present example, to simulate the state in which the brazing sheet was stored for a long time, brazing sheets D1-D4 after drying were held stationary in a constant-temperature, constant-humidity tank for seven days at a temperature of 40° C. and a relative humidity of 80% RH. Thereafter, gap-filling tests were conducted using the same method as in Working Example 1. Table 3 lists the lengths L of the fillets F of the test specimens in which the brazing sheets were used.

TABLE 3

| Brazing Sheet | Core Material | Filler Material | Composition of Liquid Etchant (mass %) | | | Etching Conditions | | Fillet Length (mm) |
|---|---|---|---|---|---|---|---|---|
| | | | Sulfuric Acid | Nitric Acid | Ferric Sulfate | Temperature (° C.) | Time (sec) | |
| D1 | B1 | A3 | 1.30 | 0.14 | 0.35 | 50 | 10 | 31.7 |
| D2 | B1 | A3 | 0.36 | 0.04 | 0.10 | 50 | 10 | 31.2 |
| D3 | B1 | A3 | 1.30 | 0.14 | — | 50 | 10 | 23.7 |
| D4 | B1 | A3 | 0.36 | 0.04 | — | 50 | 10 | 24.8 |

As shown in Table 3, with regard to brazing sheets D1, D2, which were etched using liquid etchants that contained an inorganic acid and ferric sulfate, it was possible to lengthen the lengths L of the fillets F more than those of brazing sheets D3, D4, which were etched using liquid etchants that did not contain ferric sulfate.

Based on these results, it was understood that, by etching a brazing sheet using a liquid etchant that contains an inorganic acid and iron ions, the storage stability of the brazing sheet was further improved, and thereby degradation in brazeability during storage could be curtailed over a longer time.

The invention claimed is:

1. A brazing-sheet manufacturing method for brazing an aluminum material in an inert-gas atmosphere without using flux, comprising:
    a layering process in which a clad slab is manufactured that comprises: a core-material slab composed of an aluminum material; and a filler-material slab composed of an Al—Si—Mg series alloy and disposed on at least one surface of the core-material slab;
    a hot-rolling process in which a clad sheet—which comprises: a core material composed of the core-material slab; and a filler material composed of the filler-material slab and disposed on at least one surface of the core-material slab—is manufactured by performing hot rolling on the clad slab;
    a cold-rolling process in which one or more passes of cold rolling are performed on the clad sheet; and
    an etching process in which, between cold-rolling passes in the cold-rolling process or after the completion of the cold-rolling process, a surface of the clad sheet is etched using a liquid etchant that includes one or more inorganic acids,
    wherein the liquid etchant does not contain fluorine atoms.

2. The brazing-sheet manufacturing method according to claim 1, wherein the Al—Si—Mg series alloy that constitutes the filler-material slab contains Si: 3 mass % or more and 13 mass % or less, Mg: 0.1 mass % or more and 2.0 mass % or less, and Bi: 1.0 mass % or less.

3. The brazing-sheet manufacturing method according to claim 1, wherein the liquid etchant further contains ferric sulfate.

4. The brazing-sheet manufacturing method according to claim 3, wherein the liquid etchant contains sulfuric acid and nitric acid as the inorganic acids.

5. The brazing-sheet manufacturing method according to claim 4, wherein, in the liquid etchant, the concentration of sulfuric acid is 0.20 mass % or more and 2.0 mass % or less, the concentration of nitric acid is 0.02 mass % or more and 0.50 mass % or less, and the concentration of ferric sulfate is 0.10 mass % or more and 1.0 mass % or less.

6. The brazing-sheet manufacturing method according to claim 5, wherein the Al—Si—Mg series alloy that constitutes the filler-material slab contains Si: 3 mass % or more and 13 mass % or less, Mg: 0.1 mass % or more and 2.0 mass % or less, and Bi: 1.0 mass % or less.

7. The brazing-sheet manufacturing method according to claim 1, wherein the aluminum material of the core-material slab contains 0.10 to 4.0 mass % Mg.

8. The brazing-sheet manufacturing method according to claim 1, wherein the aluminum material of the core-material slab contains 0.40 to 1.0 mass % Mg.

9. The brazing-sheet manufacturing method according to claim 7, wherein the aluminum material of the core-material slab contains:
    0.05 to 1.60 mass % Mn;
    1.0 mass % or less Si;
    1.0 mass % or less Fe;
    2.0 mass % or less Cu;
    6.5 mass % or less Zn;
    0.20 mass % or less Ti;
    0.50 mass % or less Cr; and
    0.50 mass % or less Zr.

10. The brazing-sheet manufacturing method according to claim 9, wherein the Al—Si—Mg series alloy that constitutes the filler-material slab contains:
    3-13 mass % Si;
    0.1-2.0 mass % Mg; and
    1.0 mass % or less Bi.

11. The brazing-sheet manufacturing method according to claim 1, wherein the one or more inorganic acids in the liquid etchant are 0.2-3.70 mass % sulfuric acid and 0.5 mass % or less nitric acid.

12. The brazing-sheet manufacturing method according to claim 1, wherein the liquid etchant contains 0.05-1.0 mass % ferric sulfate.

13. The brazing-sheet manufacturing method according to claim 1, wherein the liquid etchant contains 0.10-1.0 mass % ferric sulfate.

14. A manufacturing method, comprising:
    superposing a core-material slab on or adjacent to at least one surface of a filler-material slab to form a clad slab, the core-material slab being composed of an aluminum material and the filler-material slab being composed of an Al—Si—Mg series alloy;
    hot rolling the clad slab to form a clad sheet having a core material layer composed of the aluminum material of the core-material slab and a filler material layer composed of the Al—Si—Mg series alloy of the filler-material slab;
    subjecting the clad sheet to one or more passes of cold rolling; and
    either between cold-rolling passes or after the completion of the cold rolling, etching a surface of the clad sheet using a liquid etchant that includes one or more inorganic acids,
    wherein the liquid etchant does not contain fluorine atoms.

15. The manufacturing method according to claim 14, wherein the Al—Si—Mg series alloy contains:
    3-13 mass % Si;
    0.1-2.0 mass % Mg; and
    1.0 mass % or less Bi.

16. The manufacturing method according to claim 15, wherein the one or more inorganic acids in the liquid etchant are 0.2-3.70 mass % sulfuric acid and 0.5 mass % or less nitric acid.

17. The manufacturing method according to claim 15, wherein the aluminum material of the core-material slab contains:
    0.40 to 1.0 mass % Mg;
    0.05 to 1.60 mass % Mn;
    1.0 mass % or less Si;
    1.0 mass % or less Fe;
    2.0 mass % or less Cu;
    6.5 mass % or less Zn;
    0.20 mass % or less Ti;
    0.50 mass % or less Cr; and
    0.50 mass % or less Zr.

18. The manufacturing method according to claim 17, wherein the liquid etchant further contains ferric sulfate.

19. The manufacturing method according to claim 17, wherein the liquid etchant contains 0.05-1.0 mass % ferric sulfate.

20. The manufacturing method according to claim 14, further comprising, after the clad sheet has been etched, brazing the clad sheet without using flux.

21. The brazing-sheet manufacturing method according to claim 1, wherein:
  in the hot-rolling process, the filler material is joined to at least one surface of the core material; and
  in the etching process, at least an outermost surface of the filler material of the clad sheet is etched.

22. The brazing-sheet manufacturing method according to claim 21, wherein:
  the Al—Si—Mg series alloy that constitutes the filler-material slab consists of 3-13 mass % Si, 0.1-2.0 mass % Mg, 1.0 mass % or less Bi, 0.30 mass % or less Li, 2.0 mass % or less Cu, 6.5 mass % or less Zn, 0.10 mass % or less Sn, 0.10 mass % or less In, 0.030 mass % or less Sr, 0.030 mass % or less Na and 0.030 mass % or less Sb, the balance being aluminum and unavoidable impurities;
  the aluminum material that constitutes the core-material slab comprises 0.10 mass % Mg, and 1.0 mass % or less Si;
  the liquid etchant further contains a salt that contains iron ions; and
  in the etching step, 0.05-1.0 $g/m^2$ is removed from the outermost surface of the filler material of the clad sheet.

23. The brazing-sheet manufacturing method according to claim 22, wherein the liquid etchant contains:
  sulfuric acid and nitric acid as the inorganic acid; and
  ferric sulfate as the salt that contains iron ions.

* * * * *